US012645090B2

(12) United States Patent
Valente et al.

(10) Patent No.: US 12,645,090 B2
(45) Date of Patent: Jun. 2, 2026

(54) COMPACT XCUBE LIGHT ENGINE ASSEMBLY

(71) Applicant: GOOGLE LLC, Mountain View, CA (US)

(72) Inventors: Matthew Thomas Valente, Sunnyvale, CA (US); Daniel J. Effinger, Hamilton (CA)

(73) Assignee: GOOGLE LLC, Mountain View, CA (US)

( * ) Notice: Subject to any disclaimer, the term of this patent is extended or adjusted under 35 U.S.C. 154(b) by 333 days.

(21) Appl. No.: 18/374,199

(22) Filed: Sep. 28, 2023

(65) Prior Publication Data

US 2025/0110345 A1      Apr. 3, 2025

(51) Int. Cl.
*G02B 27/14*          (2006.01)
*G02B 27/01*          (2006.01)
(52) U.S. Cl.
CPC ....... *G02B 27/149* (2013.01); *G02B 27/0172* (2013.01); *G02B 2027/0114* (2013.01); *G02B 2027/0178* (2013.01)
(58) Field of Classification Search
CPC .............. G02B 27/0093; G02B 27/017; G02B 27/0172; G02B 27/0176; G02B 27/0178; G02B 27/149; G02B 2027/0125; G02B 2027/0169; G02B 2027/0174; G02B 2027/0178; G02B 2027/0112; G02B 2027/0114; G03B 21/20; G03B 21/145; G03B 21/208; G03B 21/2006; G03B 21/2013; G03B 21/2033; G03B 21/2046; G03B 21/2053
See application file for complete search history.

(56) References Cited

U.S. PATENT DOCUMENTS

| | | | |
|---|---|---|---|
| 10,545,346 B2 * | 1/2020 | Waldern ............. | G02B 27/0176 |
| 2007/0195257 A1 | 8/2007 | Taylor et al. | |
| 2009/0009719 A1 | 1/2009 | Ryf | |
| 2012/0004012 A1 | 1/2012 | Hamblin et al. | |

(Continued)

OTHER PUBLICATIONS

Chen, J. "The Corlorful World of Dichroic Cubes", OnElectronTech; Jun. 19, 2020; downloaded on Aug. 9, 2023 from <<https://www.onelectrontech.com/the-colorful-world-of-dichroic-cubes/>>, 11 pages.

(Continued)

*Primary Examiner* — Sultan Chowdhury

(57) ABSTRACT

A light engine includes a housing, a lens barrel disposed at a first surface of the housing opposite a second surface of the housing, a dichroic combiner, and first, second, and third microLED panel assemblies, each having a microLED panel coupled to a connector interface via a flex cable. The first microLED panel assembly is disposed at a third surface of the housing and arranged such that the flex cable extends first toward the barrel assembly and then turns back toward the second surface. The second microLED panel assembly is disposed at a fourth surface of the housing and arranged such that the flex cable extends first toward the barrel assembly and then turns back toward the second surface. The third microLED panel assembly is disposed at the second surface of the housing and arranged such that the flex cable extends toward either the third surface or the fourth surface.

9 Claims, 7 Drawing Sheets

(56)　　　　　References Cited

U.S. PATENT DOCUMENTS

2016/0313556 A1　10/2016　Futterer
2020/0004025 A1 *　1/2020　Lee ...................... G02B 6/0035
2020/0404773 A1 *　12/2020　Uogishi ................ H05K 1/028
2022/0099978 A1　3/2022　Eash et al.
2022/0299769 A1 *　9/2022　Effinger ............. G02B 27/0081
2023/0393454 A1 *　12/2023　Zhang ................ H10H 20/855

OTHER PUBLICATIONS

UBD, "MicroLED 0.13" Display, downloaded Aug. 9, 2023 from <<https://www.jb-display.com/weixianshiping/124.html>>, 6 pages.
UBD, "MicroLED 0.4 CC Polychrome Projector", downloaded Aug. 9, 2023 from <<https://www.jb-display.com/guangyinqing/36.html>>, 5 pages.

* cited by examiner

COMPACT XCUBE LIGHT ENGINE ASSEMBLY

BACKGROUND

The relatively small dimensions of the typical extended-reality (XR) smartglasses form factor limits the types of technologies that can be implemented to allow for full-color display. Although micro-light emitting diode (micro-LED) displays have shown promise as one such technology suitable for implementation in XR smartglasses, polychromatic microLED panels currently are impracticable due to cost, manufacturing, or other considerations compared to monochromatic microLED panels. Accordingly, a typical microLED-based light engine solution for XR smartglasses is an X-cube light engine, in which red, green, and blue monochromatic microLED panels are arranged around a dichroic combiner (also known as an "X cube") that operates to combine the monochrome red, green, and blue light individually output from the three monochromic microLED panels to output polychromatic display light, which then may be projected toward a user's eye, such as via a light-guide or other mechanism.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
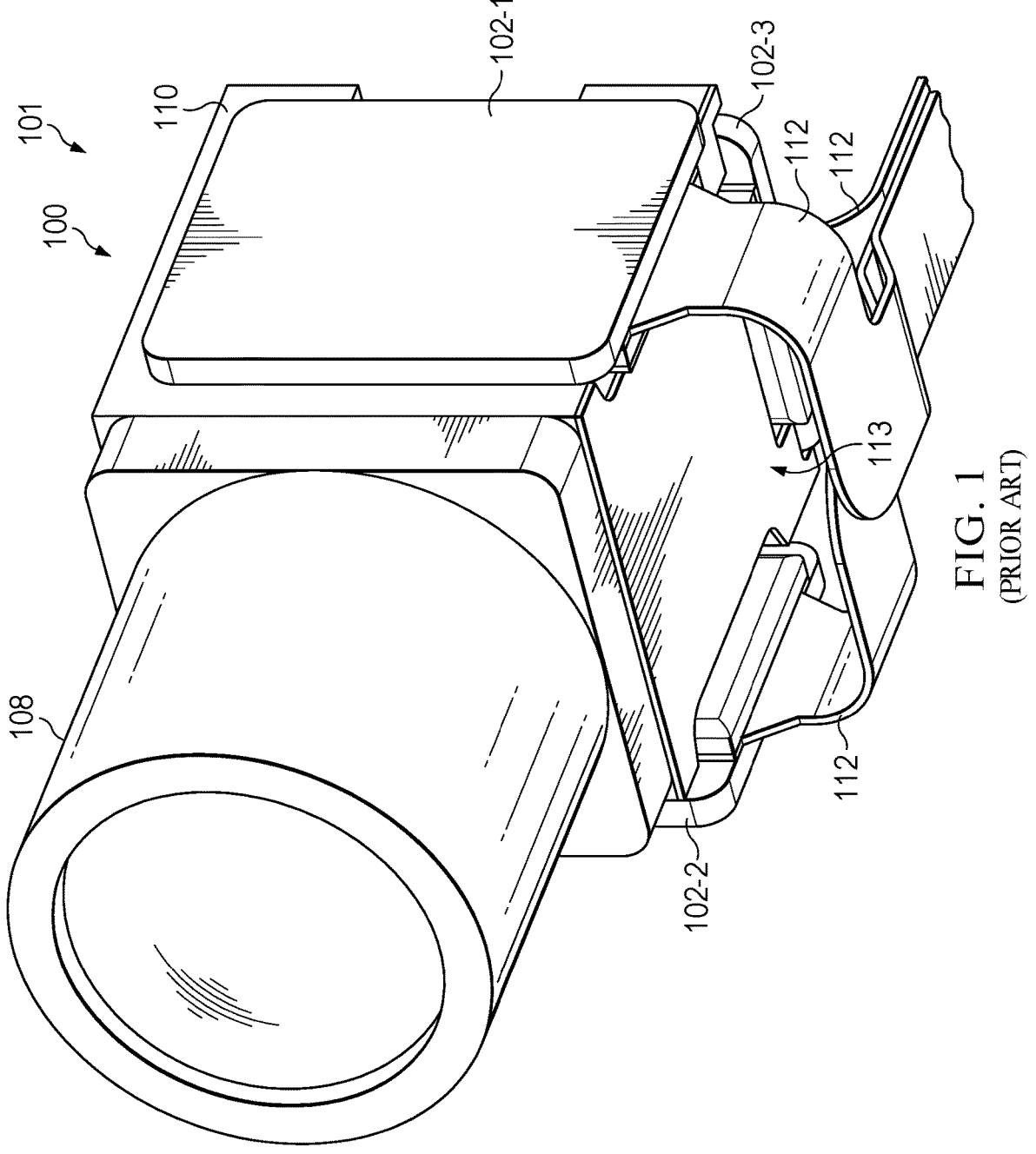
FIG. 1 is a diagram illustrating a perspective view of a conventional X-cube light engine.

FIG. 1 depicts a conventional X-cube light engine 100 that utilizes three monochromic microLED display assemblies 102-1, 102-2, 102-3 arranged around a dichroic combiner (not shown in FIG. 1) to generate a combined polychromatic display light that is projected through a lens barrel 108 having one or more lenses or other optical elements for collimating the polychromatic display light before it is output for projection toward a user's eye. As shown by the back view 202 and front view 204 of the example microLED panel assembly 102 of FIG. 2, each microLED panel assembly 102 is implemented as an assembly composed of a monochromatic microLED panel 206 mechanically and electrically coupled to a connector interface 208 via a flex cable 112. Each microLED panel 206 implements an array of single-color microLEDs (e.g., red microLEDs, green microLEDs, or blue microLEDs). The connector interface 208 is configured to electrically and mechanically couple to a corresponding interface of a processing system so as to receive display control signals for controlling the display of corresponding color-specific pixel content on the microLED panel 206, and can comprise any of a variety of industry-standard or proprietary connectors, such as a mobile industry processor interface (MIPI) connector. The flex cable 112 comprises a set of parallel conductive wires connecting contacts of the connector interface 208 to corresponding connectors of the microLED panel assembly 102, and which are electrically isolated by one or more layers of plastic or other insulative material.

Because each monochromatic microLED panel assembly 102 provides only one color of display light, the conventional X-cube light engine 100 generates full-color polychromatic display light by combining the monochromatic display light from each of the microLED panel assemblies 102-1, 102-2, and 102-3 using an X-cube (that is, a dichroic combiner) (not shown in FIG. 1) enclosed in the housing 110. In a conventional arrangement, as shown in FIG. 1, the three microLED panel assemblies 102-1, 102-2, and 102-3 are arranged around the sides ("side" being relative to the orientation of FIG. 1) of the housing 110, with the microLED panel assembly 102-1 being positioned on the right side of the housing 110 (e.g., providing red display light), the microLED panel assembly 102-2 being positioned on the left side of the housing 110 (e.g., providing blue display light), and the microLED panel assembly 102-3 being positioned on the back side of the housing 110 (e.g., providing green display light). In the illustrated conventional configuration, the microLED panel assemblies 102-1, 102-2, and 102-3 are oriented relative to the housing 110 such that the flex cable 112 of each assembly 102 extends downward (relative to the illustrated orientation) from the housing 110 and then is routed outward from the rear of the housing 110. Because the flex cables 112 can be subjected to only a limited bend radius before causing damage, this arrangement results in a relatively large empty volume 113 between the housing 110 and the bent flex cables 112 of the microLED panel assemblies 102-1, 102-2, and 102-3. As such, this results in an increase in the effective height of the form factor for the conventional X-cube light engine 100, which in turn results in requiring additional height in the arm, frame, or other component of the AR smartglasses that then implement the conventional X-cube light engine 100.

Figure 3:
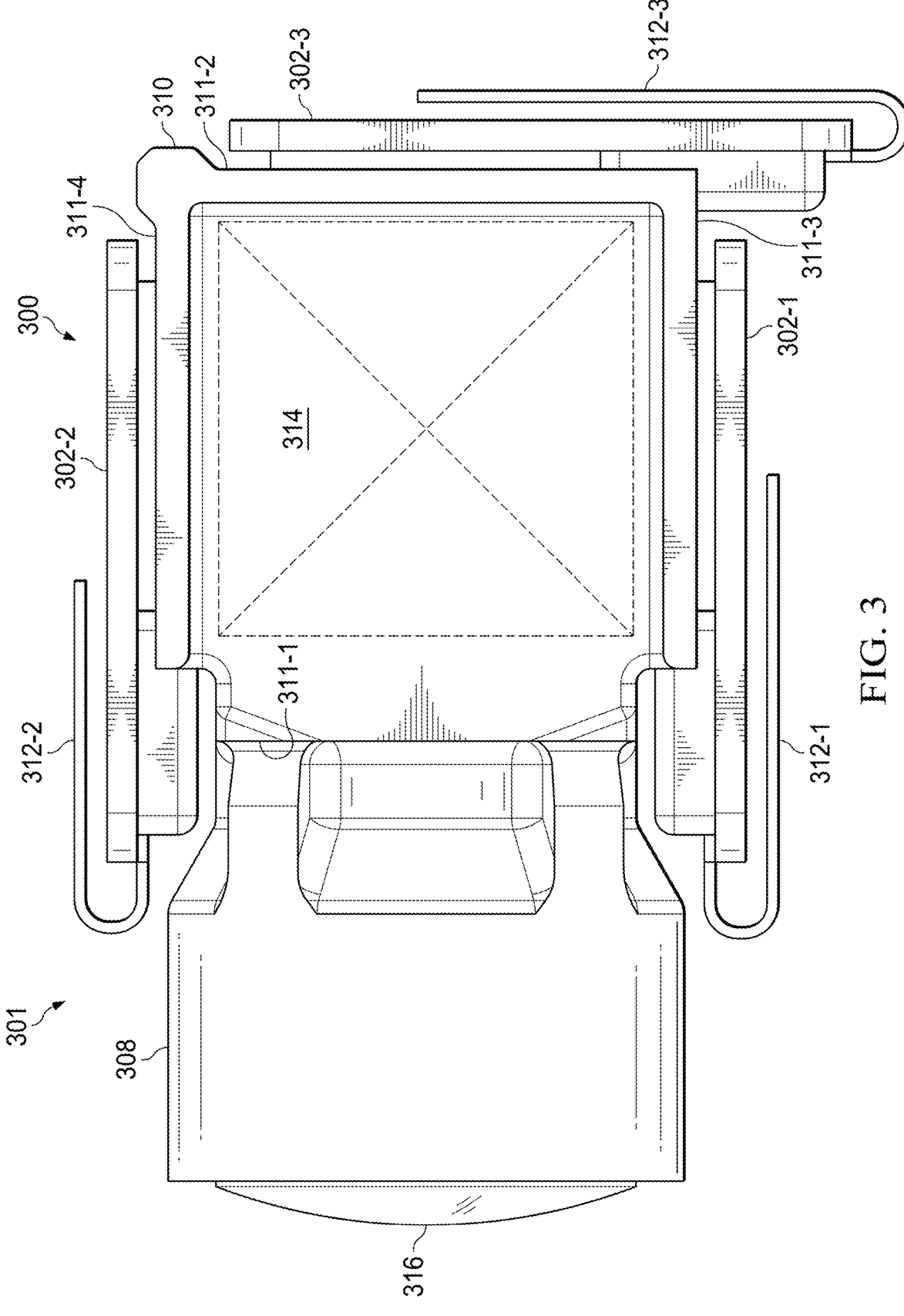
FIG. 3 is a diagram illustrating a side view of an X-cube light engine employing a space-saving microLED panel assembly arrangement in accordance with implementations.
Figure 4:
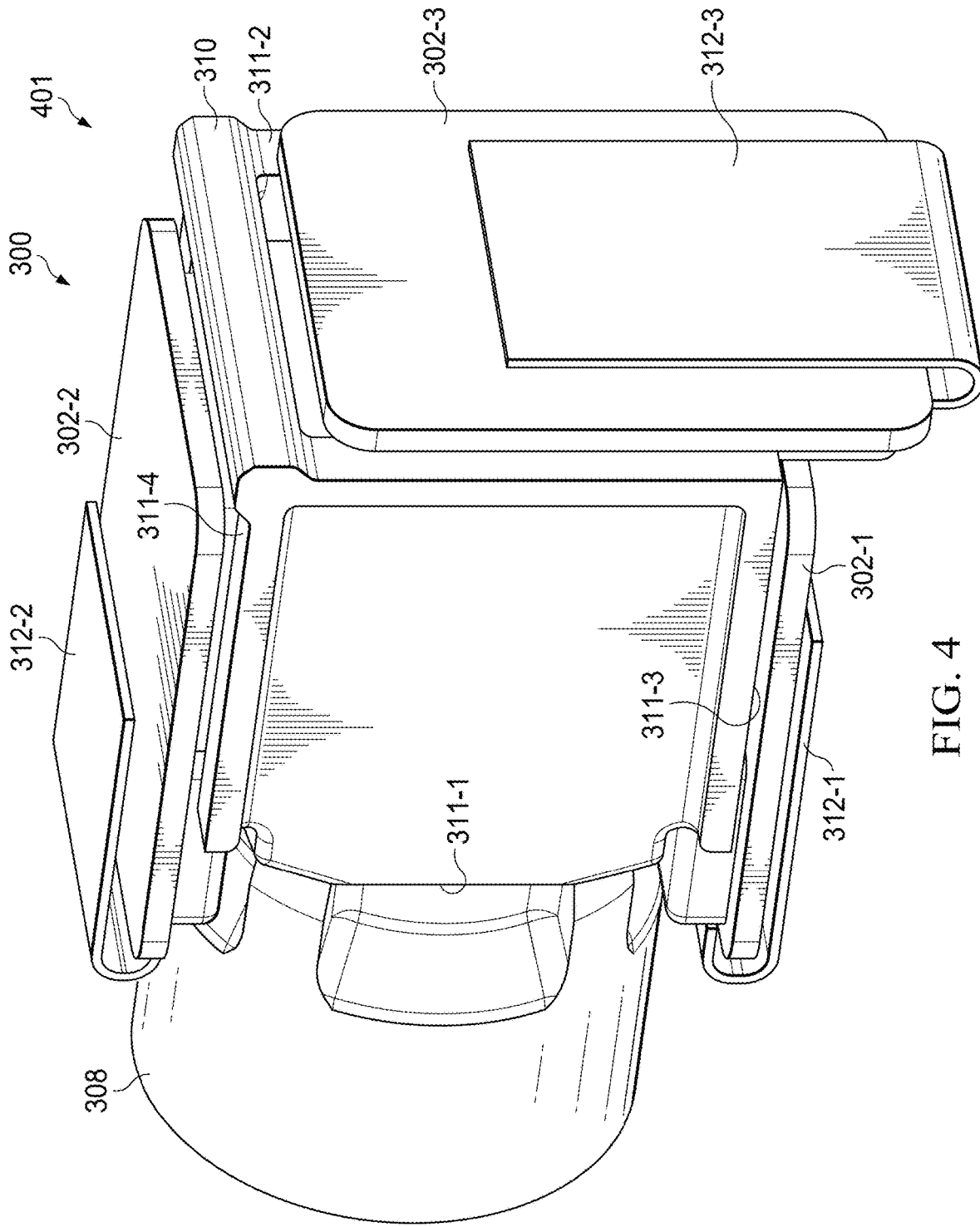
FIG. 4 is a diagram illustrating a rear perspective view of the X-cube light engine of FIG. 3 in accordance with implementations.
Figure 5:
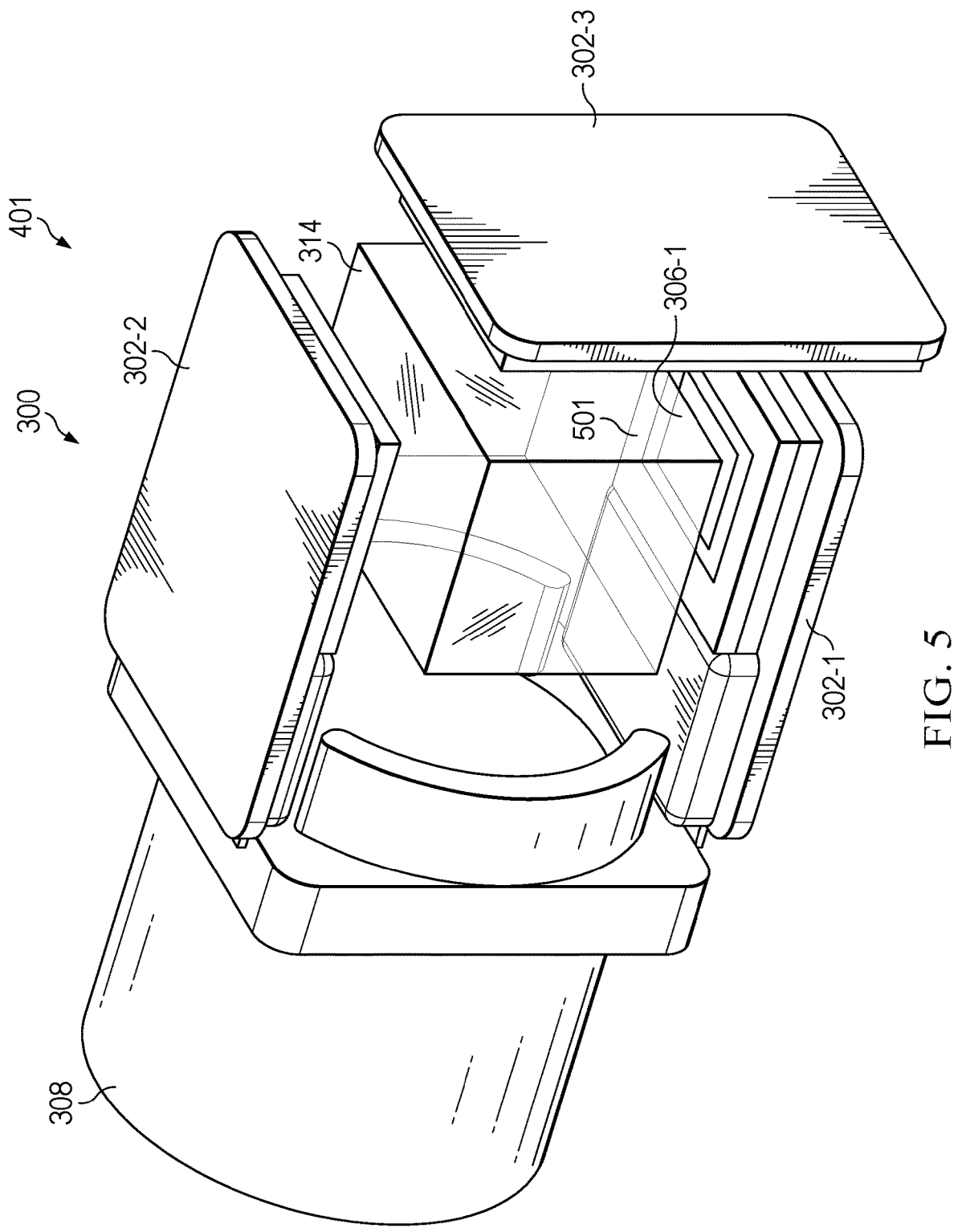
FIG. 5 is a diagram illustrating an exploded view of the X-cube light engine of FIGS. 3 and 4 in accordance with implementations.

FIGS. 3-6 illustrate implementations of an improved X-cube light engine that utilizes a particular arrangement of the microLED panel assemblies about the housing containing an X-cube so as to substantially eliminate this unused volume below the housing and thus allowing the improved X-cube light engine to be employed in smaller spaces, and thus allowing for a smaller form factor for the component of the AR smartglasses employing the X-cube light engine. FIGS. 3 and 4 depict a side view 301 (FIG. 3) and rear perspective view 401 (FIG. 4) of an X-cube light engine 300 is depicted in accordance to implementations. FIG. 5 illustrates a perspective view of the X-cube light engine 300 with the housing 310 omitted to facilitate a better understanding of the orientation of the remaining components. As shown, the X-cube light engine 300 includes a lens barrel 308 coupled to a housing 310 containing an X-cube 314 (that is, a dichroic combiner 314). The lens barrel 308 includes one or more lenses 316 to collimate light output by the X-cube 314, as described below.

Figure 2:
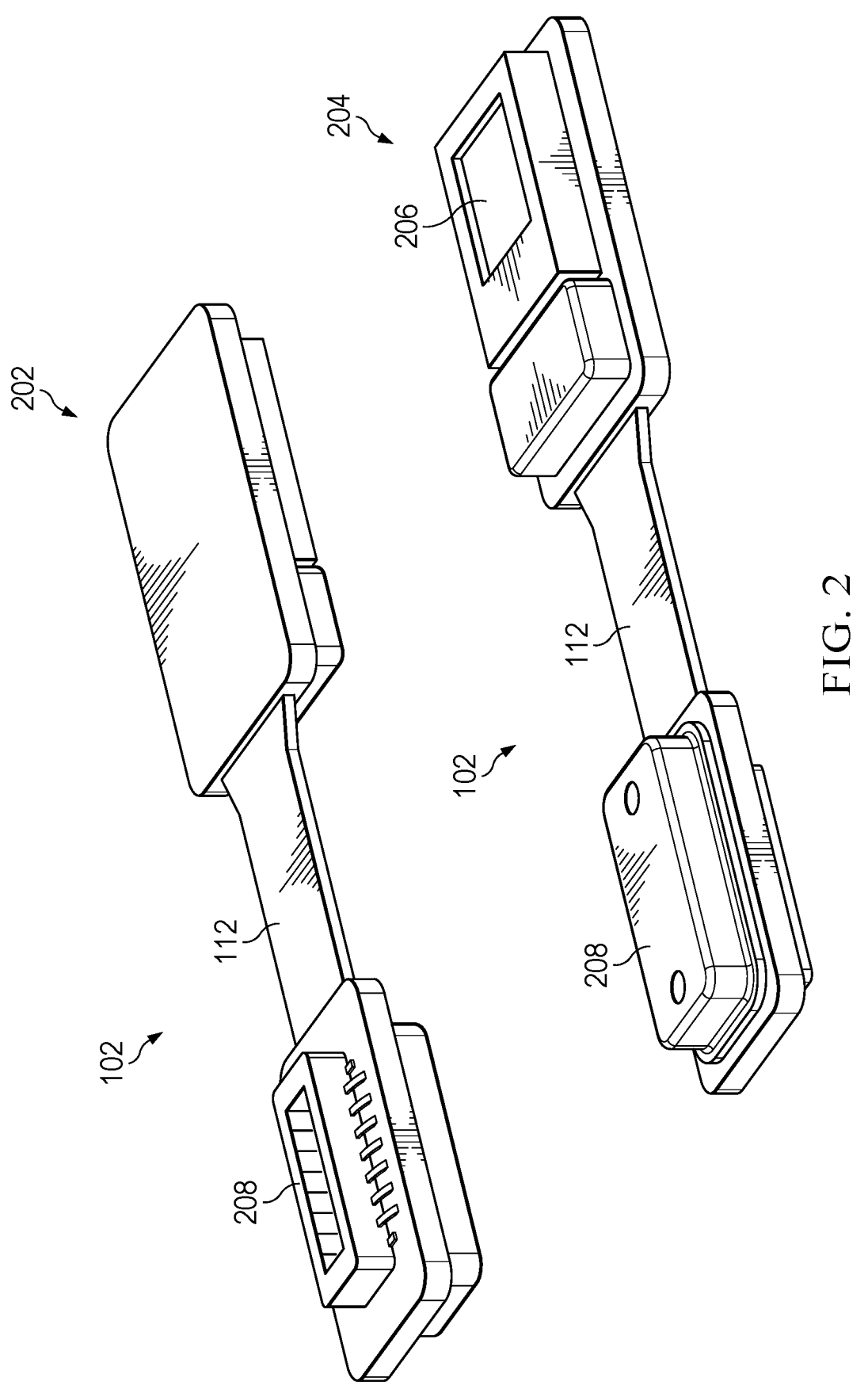
FIG. 2 is a diagram illustrating a perspective view of a microLED panel assembly in accordance with implementations.

Coupled to the housing 310 are three microLED display assemblies 302-1, 302-2, and 302-3 (embodiments of the microLED panel assembly 102, FIG. 2). As shown, the microLED panel assembly 302-1 is disposed at the bottom (relative to the orientation shown in FIG. 3) (surface 311-3) of the housing 310 such that monochromatic display light output by the microLED panel 206 (FIG. 2) enters the housing 310 through a corresponding aperture on the bottom of the housing 310 and impinges on a facing surface of the X-cube 314. The microLED panel assembly 302-1 is arranged relative to the housing 310 such that the flex cable 312-1 initially extends away from the microLED panel 206 toward the front (relative to the orientation shown in FIG. 3) of the X-cube light engine 300 (surface 311-1) (that is toward the end of the lens barrel 308) before a 180-degree bend that then sends the opposing end of the flex cable 312-1 (and the corresponding connector interface (not shown)) towards the back (surface 311-2) of the X-cube light engine 300.

The microLED panel assembly 302-2 is disposed at the top (relative to the orientation shown in FIG. 3) (surface 311-4) of the housing 310 such that monochromatic display light output by the microLED panel 206 enters the housing 310 through a corresponding aperture on the top of the housing 310 and impinges on a facing surface of the X-cube 314. The microLED panel assembly 302-2 is arranged relative to the housing 310 such that the flex cable 312-2 initially extends away from the microLED panel 206 toward the front (relative to the orientation shown in FIG. 3) (surface 311-1) of the X-cube light engine 300 (that is toward the end of the lens barrel 308)—before a 180-degree bend that then sends the opposing end of the flex cable 312-2 (and the corresponding connector interface (not shown)) towards the back (surface 311-2) of the X-cube light engine 300.

The microLED panel assembly 302-3 is disposed at the rear (relative to the orientation shown in FIG. 3) (surface 311-2) of the housing 310 such that monochromatic display light output by the microLED panel 206 enters the housing 310 through a corresponding aperture at the rear of the housing 310 and impinges on a facing surface of the X-cube 314. The microLED panel assembly 302-3 is arranged relative to the housing 310 such that the flex cable 312-3 initially extends away from the microLED panel 206 away from the bottom (relative to the orientation shown in FIG. 3) (surface 311-3) of the X-cube light engine 300 before a 180-degree bend that then sends the opposing end of the flex cable 312-2 (and the corresponding connector interface (not shown)) back towards the top (surface 311-4) of the X-cube light engine 300. Alternatively, the microLED panel assembly 302-3 can be arranged relative to the housing 310 such that the flex cable 312-3 initially extends away from the microLED panel 206 away from the top (relative to the orientation shown in FIG. 3) (surface 311-4) of the X-cube light engine 300 (that is toward the end of the lens barrel 308) before a 180-degree bend that then sends the opposing end of the flex cable 312-2 (and the corresponding connector interface (not shown) back towards the top of the X-cube light engine 300. With this configuration, no excess unused volume is needed to gather then route the three flex cables 312-1, 312-2, and 312-3 together and out from under the housing, in contrast to the conventional approach as illustrated in FIG. 1.

Figure 6:
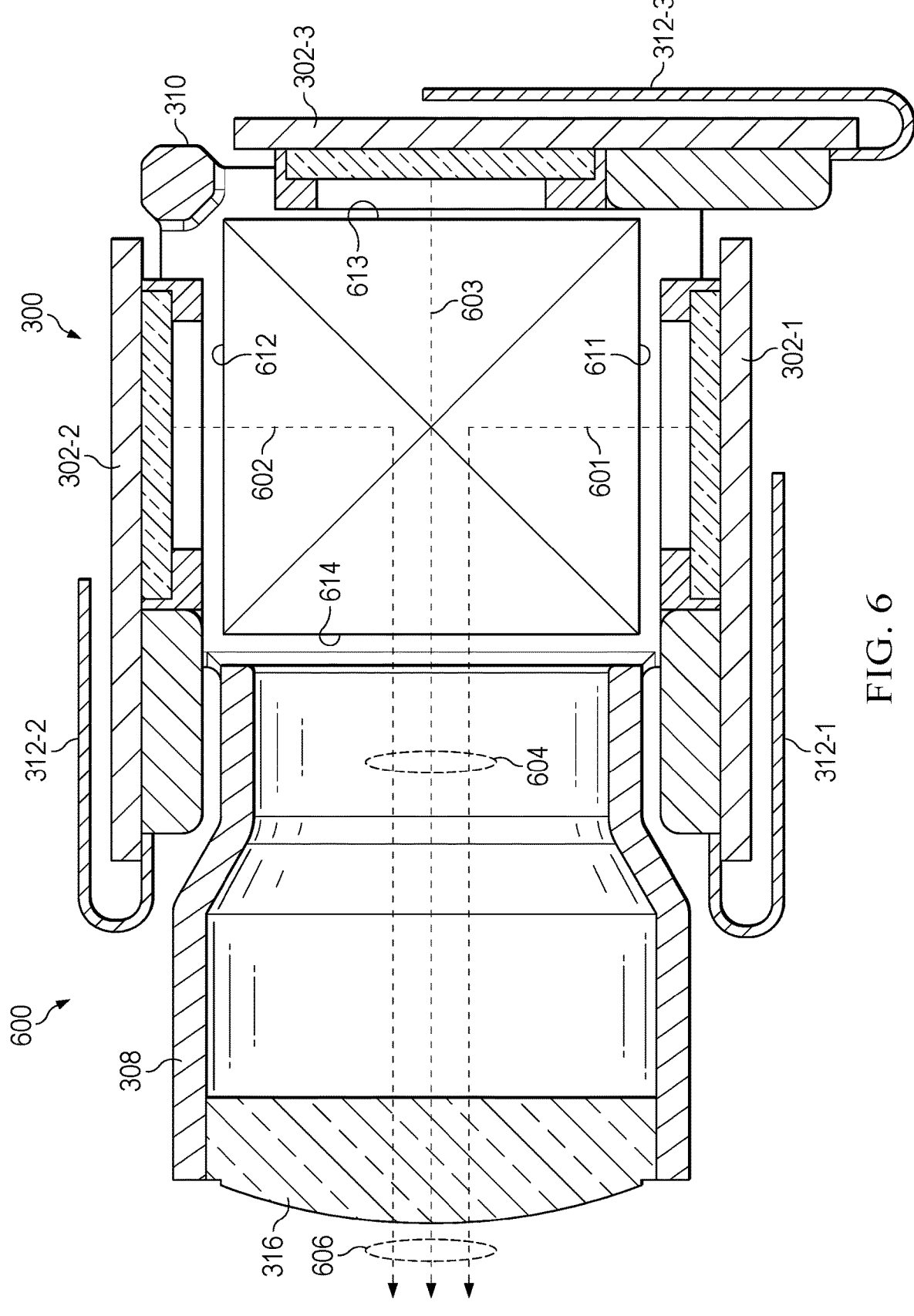
FIG. 6 is a diagram illustrating a cross-section side view of the X-cube light engine of FIGS. 3-5 in accordance with implementations.

FIG. 6 illustrates an example operation of the X-cube light engine 300 with reference to a cross-section side view 600 of the X-cube light engine 300 in accordance with implementations. As shown, each of the microLED display assemblies 302-1, 302-2, 302-3 is positioned around the housing 310 such that the microLED display of each assembly 302 emits display light that passes through a corresponding aperture in the housing 310 and impinges on a facing surface (e.g., surface 501) of the X-cube 314. For example, the microLED panel 306-1 (e.g., an instance of microLED panel 206, FIG. 2) of the microLED panel assembly 302-1 emits red display light 601 that passes through a corresponding aperture and impinges on a facing surface 611 of the X-cube 314; the microLED display 306-3 of the microLED panel assembly 302-3 emits blue display light 602 that passes through a corresponding aperture and impinges on a facing surface 612 of the X-cube 314; and the microLED display 306-3 of the microLED panel assembly 302-3 emits red display light 603 that passes through a corresponding aperture and impinges on a facing surface 613 of the X-cube 314. The X-cube 314 combines the three separate monochromatic display lights 601, 602, 603 into an output polychromatic display light 604 that is then projected from a corresponding surface 614 into the lens barrel 308. The one or more optical elements (e.g., lens 312) of the lens barrel 308 then collimate the polychromatic display light 604, resulting in collimated polychromatic display light 606 being projected from the lens barrel 308.

Figure 7:
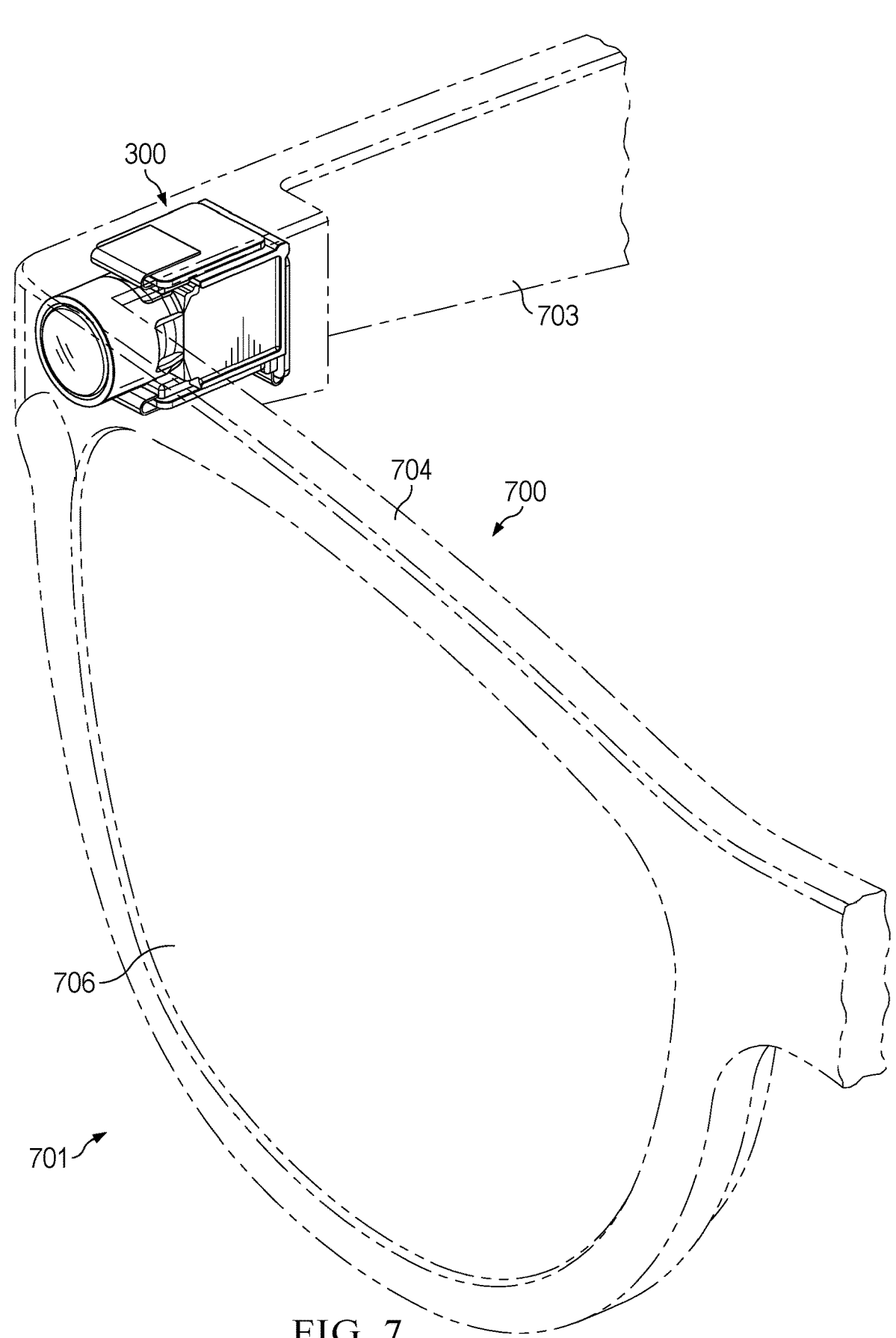
FIG. 7 is a diagram illustrating a set of XR smartglasses utilizing the X-cube light engine of FIGS. 3-6 in accordance with implementations.

FIG. 7 illustrates a partial perspective view 701 of AR smartglasses 700 implementing the X-cube light engine 300 in accordance with implementations. As depicted, the light engine 300 may be implemented in an arm 703 of a frame 704 such that the collimated polychromatic display light output by the X-cube light engine 300 is incoupled to a waveguide implemented in an eyeglass lens 706 via an incoupler (IC) and then propagated through the waveguide to an outcoupler (OC) in the eyeglass lens 706, whereupon the propagated display light is output towards a user's eye (not shown).

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A light engine comprising:
a housing;
a lens barrel disposed at a first surface of the housing opposite a second surface of the housing;
a dichroic combiner disposed in the housing;
first, second, and third microLED panel assemblies, each of the first, second, and third microLED panel assemblies having a microLED panel coupled to a connector interface via a flex cable; and
wherein the microLED panel of the first microLED panel assembly is disposed at a third surface of the housing and arranged such that the flex cable of the first microLED panel assembly extends first from the microLED panel toward the lens barrel and then turns back toward the second surface;
wherein the microLED panel of the second microLED panel assembly is disposed at a fourth surface of the housing and arranged such that the flex cable of the second microLED panel assembly extends first from the microLED panel toward the lens barrel and then turns back toward the second surface; and
wherein the microLED panel of the third microLED panel assembly is disposed at the second surface of the housing and arranged such that the flex cable of the third microLED panel assembly extends first from the microLED panel away from the third surface and then turns back toward the third surface.

2. The light engine of claim 1, wherein:
each of the first, second, and third microLED panel assemblies is configured to output monochromatic display light; and
the dichroic combiner is configured to combine the monochromatic display light from each of the first, second, and third microLED panel assemblies to generate polychromatic display light output toward the lens barrel.

3. The light engine of claim 2, wherein the lens barrel comprises one or more optical elements to collimate the polychromatic display light output from the dichroic combiner.

4. The light engine of claim 3, wherein the housing has an aperture at each of the second, third, and fourth surfaces to facilitate transmission of monochromatic display light from the microLED panels of the first, second, and third microLED panel assemblies into the dichroic combiner.

5. The light engine of claim 1, wherein the fourth surface is opposite the third surface.

6. A set of extended reality (XR) glasses implementing the light engine of claim 1.

7. The set of XR glasses of claim 6, further comprising:
a glasses frame comprising an arm;
a lens set in the glasses frame and implementing a waveguide; and
wherein the light engine is disposed in the arm or frame of the glasses and configured to project polychromatic display light into the waveguide for propagation toward a user's eye.

8. A method of operating the light engine of claim 1, comprising:
outputting a first monochromatic display light from the first microLED panel assembly;
outputting a second monochromatic display light from the second microLED panel assembly;
outputting a third monochromatic display light from the third microLED panel assembly;
combining the first, second, and third monochromatic display lights at the dichroic combiner to generate a polychromatic display light; and
collimating the polychromatic display light at the lens barrel.

9. The method of claim 8, further comprising:
projecting the collimated polychromatic display light into a waveguide implemented in a lens of a set of extended reality glasses; and
propagating the collimated polychromatic display light through the waveguide to an outcoupler for output toward a user's eye.

* * * * *